(12) United States Patent
Goldstein

(10) Patent No.: US 6,671,361 B2
(45) Date of Patent: Dec. 30, 2003

(54) TELECOMMUNICATIONS SYSTEM AND METHOD RELATING TO TELECOMMUNICATIONS SERVICES WITH NUMBER TRANSLATION

(75) Inventor: Peter Goldstein, Thalwil (CH)

(73) Assignee: Siemens Schwiez AG, Zurich (CH)

( * ) Notice: Subject to any disclaimer, the term of this patent is extended or adjusted under 35 U.S.C. 154(b) by 265 days.

(21) Appl. No.: 09/940,093

(22) Filed: Aug. 27, 2001

(65) Prior Publication Data

US 2002/0075905 A1 Jun. 20, 2002

Related U.S. Application Data (63) Continuation of application No. PCT/EP00/01286, filed on Feb. 17, 2000.

(30) Foreign Application Priority Data

Feb. 25, 1999 (EP) .............................................. 99103728

(51) Int. Cl.[7] .............................. H04M 3/42; H04M 7/00
(52) U.S. Cl. .......................... 379/201.01; 379/207.01; 379/219; 379/230
(58) Field of Search ............ 379/207.01, 207.1–207.16, 379/209.01, 219, 230

(56) References Cited

U.S. PATENT DOCUMENTS 6,055,303 A * 4/2000 Bowman .................... 379/207

FOREIGN PATENT DOCUMENTS

| EP | 0 769 882 A1 | 4/1997 |
|---|---|---|
| WO | WO 97/17794 | 5/1997 |
| WO | WO 98/21903 | 5/1998 |
| WO | WO 98/49819 | 11/1998 |

\* cited by examiner

Primary Examiner—William J Deane
(74) Attorney, Agent, or Firm—Laurence A. Greenberg; Werner H. Stemer; Gregory L. Mayback (57) ABSTRACT

A telecommunications system containing a plurality of local and transit exchanges in which signaling and traffic data are routed between remote exchanges via a network service having routing code recalculation is described. The system is adapted to provide an ISDN end-to-end supplementary service between two subscribers in which a subscriber access code is generated by modification of a called subscriber routing code, used by the calling subscriber local exchange. The local exchanges that have an applications service element for providing the ISDN supplementary service, include a mechanism to trigger a query, which is sent to a translation device whenever the supplementary service is requested and a subscriber routing code is detected. The subscriber access code returned from the translation device is forwarded to the applications service element, which will establish an end-to-end dialogue with it's counterpart at the called subscriber local exchange and provide the ISDN supplementary service.

5 Claims, 4 Drawing Sheets

TELECOMMUNICATIONS SYSTEM AND METHOD RELATING TO TELECOMMUNICATIONS SERVICES WITH NUMBER TRANSLATION

CROSS-REFERENCE TO RELATED APPLICATION

This application is a continuation of copending International Application No. PCT/EP00/01286, filed Feb. 17, 2000, which designated the United States.

BACKGROUND OF THE INVENTION

FIELD OF THE INVENTION

The present invention relates to a method for operating a telecommunications system containing a plurality of local exchanges in which signaling and traffic data are routed via a network service having routing code recalculation. The method is adapted to provide an integrated services digital network (ISDN) end-to-end supplementary service involving an interaction between two subscribers connected to a local exchange in which knowledge of the subscriber access code used in a called subscriber local exchange is required in the calling subscriber local exchange. The subscriber access code is generated by modification of a called subscriber routing code used by a calling subscriber local exchange. The modification occurs in a transit exchange or a service control point having a translation capability for converting the called subscriber routing code into the subscriber access code. Each local exchange has an application service element for providing the ISDN end-to-end supplementary service.

ISDN end-to-end supplementary services using end-to-end signaling, as defined in ITU-T Recs., e.g. I.253.3, do not work if number translation is required.

A completion of calls to busy subscriber (CCBS) supplementary service is one example of a subscriber service which uses end-to-end signaling, and in which the service is implemented by operations performed in both a calling subscriber local exchange and a called subscriber local exchange. Implementation of a CCBS service requires that the calling subscriber local exchange has knowledge of the called subscriber access code, as used in the called subscriber local exchange.

Completion of calls to a busy subscriber is defined in ITU-T Recommendation I.253.3.

The completion of calls to busy subscribers (CCBSs) supplementary service enables a calling user A, upon encountering a busy destination B, to be notified when the busy destination B becomes free and to have the service provider reinitiate the call to the specified destination B if user A desires. The CCBS supplementary service is applicable to users who are connected to the network via a basic access or a primary rate access. The CCBS supplementary service enables user A, upon encountering a busy destination B, to have the call completed without having to make a new call attempt when destination B becomes free. When user A requests the CCBS supplementary service, the network will monitor for destination B becoming free. When destination B becomes free, then the network will wait a short time as defined in the destination B idle guard timer in order to allow the resources to be reused for originating a call. If the resources are not reused by destination B within this time, then the network will automatically recall user A. When user A accepts the CCBS recall, then the network will automatically generate a CCBS call to destination B.

Global virtual network service (GVNS) is one example of a network service that modifies the routing code (dialed number), with the result that there is no transparency through the network for the called subscriber access code, as used in the called subscriber local exchange.

The global virtual network service is defined in ITU-T Recommendation F.16. The global virtual network service (GVNS) is a multi-network international service that provides private network functions to users at geographically dispersed international locations while minimizing the need for dedicated network resources. It may be offered to customers over the PSTN and/or ISDN. The global virtual network service is a feature-rich communications service. It provides the functions typically associated with the private networks, but utilizing the public switched network(s). The GVNS customer network configuration is defined per customer direction using customer-specific service information resident in multiple networks. The network configurations may be administered by the GVNS customer directly, the GVNS participating service provider(s) and/or the GVNS co-ordinator(s). The GVNS provides the customers with global services as a result of internetworking among the GVNS participating service providers in various countries. GVNS may accommodate this interconnection both via ISDN and non-ISDN facilities.

International Patent Disclosure WO 97/17794 describes a solution to provide CCBS over GVNS for a telecommunications system containing a plurality of local exchanges in which signaling and traffic data are routed between local exchanges via a network service having routing code recalculation. The network service includes a plurality of transit nodes, and a method to provide a supplementary subscriber service involving an interaction between two subscribers. In the method knowledge of a subscriber access code, used in a called subscriber local exchange, is required in a calling subscriber local exchange. The subscriber access code is generated by modification of a called subscriber routing code, used by the calling subscriber local exchange; and the modification occurs in a transit node of the network service.

Figure 3:
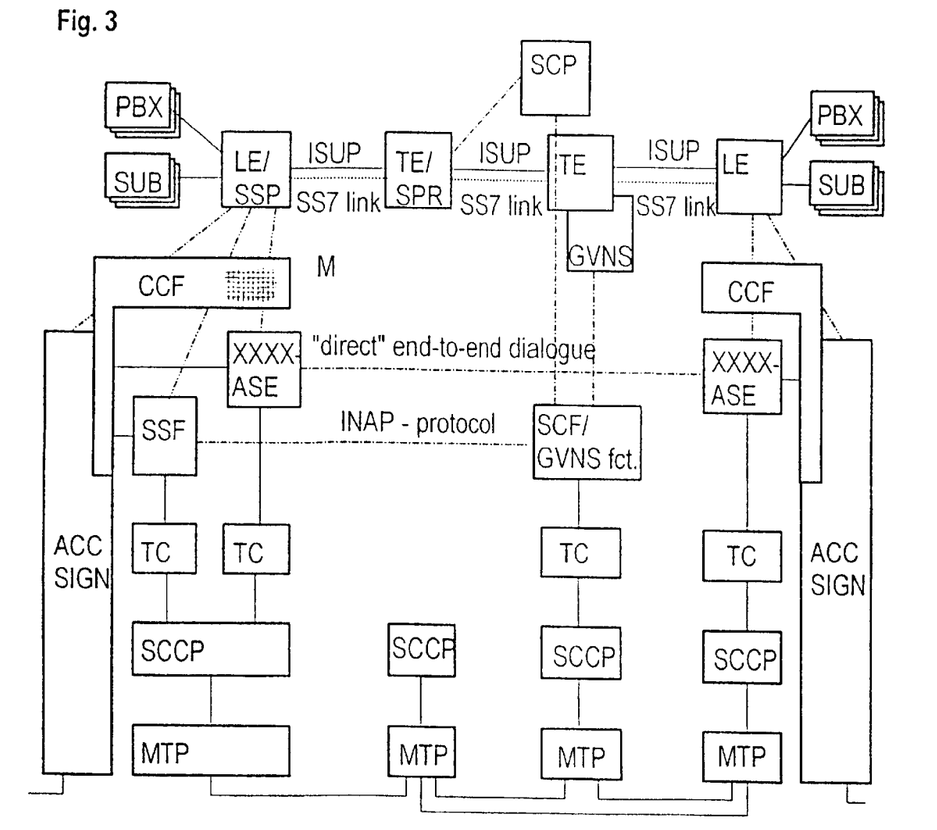
FIG. 3 is a block diagram illustrating a protocol architecture according to the invention, for provision of CCBS over GVNS.

According to International Patent Disclosure WO 97/17794 the telecommunications system is characterized in that at least some GVNS transit nodes include a relay applications service element (see International Patent Disclosure WO 97/17794, FIG. 3, new completion of calls to busy subscriber application service element (CCBS-ASE)) which is adapted to relay signaling data between local exchanges and which includes translation capabilities for converting a subscriber access code used at a called subscriber local exchange into a called subscriber routing code used by a calling subscriber exchange, and in that signaling data is transmitted between the calling and the called local exchanges via the relay application service element CCBS-ASE in the GVNS transit node.

For the backward direction (local exchange of the called subscriber to local exchange of the calling subscriber) the subscriber access code has to be translated into the called subscriber routing code and signaling data has to be transmitted between the called and the calling local exchanges via the relay application service element CCBS-ASE in the GVNS transit node.

In addition to the requirement of the relay application service element CCBS-ASE in the GVNS transit node the solution requires resources such as transaction IDs (transaction identifiers, see Table 1, positions 24, 25 below). In the GVNS transit node, where two sections of an the end-to-end dialog are connected, all messages being part of the dialog have to pass through the complete protocol stack (up and down) which increases the propagation delay of the messages.

SUMMARY OF THE INVENTION

It is accordingly an object of the invention to provide a telecommunications system and a method relating to telecommunications services with number translation which overcome the above-mentioned disadvantages of the prior art devices and methods of this general type.

With the foregoing and other objects in view there is provided, in accordance with the invention, a method for operating a telecommunications system containing a plurality of local exchanges in which signaling and traffic data are routed via a network service having routing code recalculation. The method is adapted to provide an integrated services digital network (ISDN) end-to-end supplementary service involving an interaction between two subscribers each connected to a local exchange in which knowledge of a subscriber access code used in a called subscriber local exchange is required in a calling subscriber local exchange. The subscriber access code is generated by modification of a called subscriber routing code used by the calling subscriber local exchange. The modification occurs in a transit exchange or a service control point each having a translation device for converting the called subscriber routing code into the subscriber access code. Each of the local exchanges is connected to an application service element for providing the ISDN end-to-end supplementary service. The method includes providing the local exchanges supporting the ISDN end-to-end supplementary service with a trigger mechanism for triggering and forwarding a query to the translation device whenever the ISDN end-to-end supplementary service is requested and when the called subscriber routing code is detected. The subscriber access code thus returned from the translation device is forwarded to the application service element, which, based on a received subscriber access code, will establish one and only one end-to-end dialogue with an associated counterpart at the called subscriber local exchange and provide the ISDN end-to-end supplementary service.

The method in accordance with the invention allows a direct, unchained dialogue between the application service element 1 by introducing a trigger mechanism. In a preferred embodiment the trigger mechanism is located in the call control function of the local exchange of the calling subscriber. In a further step the trigger mechanism is equipped with a memory unit, which at least temporarily retains the translated number. The invention also has application to interacting between any network service with routing code (dialed number) recalculation, referred to as number translation and any ISDN end-to-end supplementary service.

With GVNS, as initially defined, there is nothing to prevent a terminating local exchange sending a CCBS possible indicator in the backward release message, since that exchange cannot distinguish between a normal call and a GVNS call. Thus, the CCBS possible indicator is repeated all the way back to the originating exchange. If no solution is found to the problem, all GVNS calls, for which completion of calls to busy subscriber (CCBS) is requested, will lead to unnecessary signaling procedures. The problem created by the interaction between the CCBS and the GVNS will not be solved by simply omitting CCBS for GVNS calls. The CCBS request must either be prevented, or some method for handling it must be provided.

The present invention is based on a telecommunications system containing a plurality of local exchanges in which signaling and traffic data are routed between local (remote) exchanges via a network service having routing code (dialed number) recalculation, referred to as number translation, which network includes a plurality of transit nodes and/or nodes of the intelligent network. The telecommunications system being adapted to provide an ISDN end-to-end supplementary service involving an interaction between two subscribers requires:

knowledge of a subscriber access code, used in a called subscriber local exchange, is required in a calling subscriber local exchange;

the subscriber access code is generated by modification (number translation) of a called subscriber routing code (dialed number), used by the calling subscriber local exchange; and the modification (number translation) occurs in a transit node or in a service control point of the network service.

According to a first aspect of the present invention the telecommunications system is characterized in:

that a call control function in each local exchange contains a trigger mechanism for providing access to a number translation function to allow for the supplementary service, that at least some transit nodes or service control points include an application for converting a subscriber routing code (dialed number) used by a calling subscriber local exchange into a called subscriber access code used at a called subscriber local exchange, that the converted number is sent back to the calling subscriber local exchange, and that in the calling subscriber local exchange the subscriber routing code (dialed number) is linked to the called subscriber access code.

Preferably the ISDN end-to-end supplementary service is a CCBS service. Preferably the network service having routing code (dialed number) recalculation (number translation) is a GVNS service. Preferably the telecommunications system is a single unitary ISDN system. A CCBS-ASE may be located in each local exchange within the telecommunications system providing CCBS to subscribers connected thereto. Each of the plurality of transit nodes or service control points may be adapted, in use, to receive a request for number translation from a local exchange, providing CCBS to subscribers connected thereto, has an application for number translation located therein. Preferably the application is restricted to the number translation function.

In accordance with an added mode of the invention, there is the step of basing the translation device on a global virtual network service (GVNS) function located in a transit exchange or in a service control point and during the forwarding step the subscriber access code depending from the called subscriber routing code is taken from a database.

In accordance with an additional mode of the invention, there are the steps of locating the trigger mechanism in a call control function of the calling subscriber local exchange; and storing the called subscriber routing code in a memory location of the call control function assigned to the local exchange from which a call was originated is replaced by the subscriber access code and stored in the memory location.

In accordance with a further mode of the invention, there is the step of providing the translation device in the service control point and there is a service switching function contained in the local exchange and during the forwarding step the local exchange acts temporarily as the service switching point.

Other features which are considered as characteristic for the invention are set forth in the appended claims.

Although the invention is illustrated and described herein as embodied in a telecommunications system and a method relating to telecommunications services with number translation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The present invention is described below with reference to the provision of CCBS over GVNS, but as explained above the invention has application to the interaction between other telecommunications services.

In the specification a number of abbreviations and terms of art are used. Their meanings are briefly explained in Table 1 shown below. In column two of Table 1, reference is made to the document by P. Bocker titled "ISDN Das dienstein-tegrierende digitale Nachrichtennnetz (ISDN Integrated Services for a Digital Communications Network)" Springer Verlag, Berlin 1990, third edition, hereinafter (P. Bocker) in which the used terms are shown and described in detail (C.: chapter):

TABLE 1

| Pos. | P. Bocker | Term | Description |
|---|---|---|---|
| 1 | FIG. 6.14 FIG. 6.19 | A-Subscriber | a calling subscriber |
| 2 | Tab. 4.11 | A-number | a calling subscriber's E.164 number |
| 3 | FIG. 6.14 FIG. 6.19 | B-Subscriber | a called subscriber |
| 4 | Tab. 4.11 | B-number | a called subscriber's E.164 number. |
| 5 | | CCBS | Completion of Calls to Busy Subscriber. An ITU-T standardization solution is under development and will be published as ITU-T Recommendation Q.733.3. An ETSI solution has been published as ETS 300 356-18. |
| 6 | | CCBS-ASE | Application Service Element for CCBS, is the service handler for CCBS which, among other things, creates the signaling contents of the dialogues between two CCBS-ASES, one on the A-Subscriber side and one on the B-Subscriber side. |
| 7 | | CCNR | Completion of Calls on No Reply |
| 8 | | DSS1 | Digital Subscriber Signaling No. 1; the signaling protocol used at the access. |
| 9 | Tab. 4.11 | E.164 | ITU-T Recommendation E.164 describes the numbering system scheme for ordinary telephony. The B-Subscriber number and the dialed number are structured, e.g. with national elements and area code elements. |
| 10 | FIG. 1.3 | ETSI | The European Telecommunications Standards Institute. |
| 11 | | GVNS | Global virtual network service, as specified by ITU-T Recommendation Q.753.6. |
| 12 | FIG. 1.2 | ISDN | Integrated Services Digital Network. |
| 13 | FIG. 6.12 | ISUP | ISDN User Part, the signaling protocol used for inter-exchange signaling. The signaling protocol is specified in a new extended edition almost every four years. These are termed, for example, "Blue Book ISUP (1988)", "ISUP92", "ISUP-96". These have been specified by ITU in Recommendation Q.763. |
| 14 | | ISUP-96 | see ISUP |
| 15 | FIG. 6.13 | LE | Local Exchange |
| 16 | FIG. 6.12 | MTP | Message Transfer Part; Level 1–3 of SS No. 7; ITU-T Recommendations Q.701–Q.704. |
| 17 | | Q.763 | ITU-T Recommendation Q.763 describing the ISUP signaling protocol used between Telephone exchanges. |
| 18 | | Q.931 | ITU-T Recommendation Q.931 describing the signaling protocol used in subscriber access. |
| 19 | FIG. 6.13 | REL | Release message, this is the signal message transmitted via ISUP from the B-Subscriber's exchange when the physical connection is disconnected, as occurs in the case of an unsuccessful connection when the subscriber is busy. |
| 20 | | Retain option | This is a variant of the call completion service which allows for a further call completion attempt to be performed, at a later time, if the A-Subscriber is busy when the A-Subscriber's exchange is notified, from the B-Subscriber's exchange, that the B-Subscriber has become free. |
| 21 | FIG. 6.14 | SCP | Service Control Point; a node of the Intelligent Network. |
| 22 | FIG. 6.14 | SSP | Service Switching Point; a node of an Intelligent Network. |
| 23 | FIG. 6.12 | SCCP | Signaling Connection Control Part, ITU-T Recommendations Q.711–Q.716. |
| 24 | FIG. 6.12 | Transaction ID | In a TC transaction each separate transaction is identified by an identity. This is called a Transaction Identity. This facilitates a continuing dialogue between two user entities, e.g. two CCBS-ASEs |
| 25 | FIG. 6.12 | TC | Transaction Capability, ITU-T Recommendation Q.771–Q.775 |
| 26 | FIG. 6.12 | TE | Transit Exchange |

TABLE 1-continued

| Pos. | P. Bocker | Term | Description |
|---|---|---|---|
| 27 | | TNRN | Terminating Network Routing Number |
| 28 | | UPT | Universal Personal Telecommunications. An example of a service which the B-Subscriber access code is different from the routing code used at the A-Subscriber's local exchange LE. |
| 29 | | VPN | Virtual Private Network |
| 30 | | PBX | Private Branch Exchange |
| 31 | | CCF | Call Control Function (see [**], FIG. 6.16) |
| 32 | | SS7 | Signaling System No. 7 |
| 33 | | SCF | Service Control Function (IN) contained in the SCP |
| 34 | | SSF | Service Switching Function (IN) contained in the SSP |
| 35 | | IEESS | ISDN End-to-End Supplementary Service (e.g. CCBS) |
| 36 | C. 6.3.6.1 | IN | Intelligent Network (see [**], chapter 8.4, FIG. 8.4 and FIG. 9.4) |
| 37 | | INAP | IN Application Part |
| 38 | | NP | Number Portability |
| 39 | | SPR | Signaling Point Relay |

** Refer to the reference by P. Bocker titled "ISDN Digitale Netze für Sprache-, Text-, Daten, Video-, and Multimediakommunikation (ISDN Digital Net for Speech, Text, Data, Video and Multimedia Communication)" Springer Verlag, Berlin 1997, fourth Edition.

In order to fully understand the present invention, it is necessary to consider the way in which CCBS is provided on the public switched telephone network/ISDN and the way in which GVNS operates. CCBS is an ISDN end-to-end supplementary service in which, when the called subscriber is busy, a new call is established between the called subscriber and the calling subscriber as soon as the terminal of the called subscriber goes from the off-hook condition (busy), to the on-hook (idle) condition. Operation of such a service requires a signaling relation between local exchanges LE, which allows for an "end-to-end" transaction capable based dialogue.

In all the figures of the drawing, sub-features and integral parts that correspond to one another bear the same reference symbol in each case. Referring now to the figures of the drawing in detail and first, particularly, to FIG. 1 thereof, there is shown a network and protocol architecture for the provision of CCBS as shown in International Patent Disclosure WO 97/17794. CCBS operates by establishing a dialogue between completion of calls to busy subscriber application service elements (CCBS-ASEs) located in the local exchanges LE of the called and calling parties. Transit exchanges TE which may be, for example, trunk telephone exchanges, are completely transparent to the signaling dialogue established between the two CCBS-ASEs. In other words, the transit exchanges TE do not change the information contained in the signaling data transmitted between the CCBS-ASEs. The signaling system used to establish a call between the two local exchanges LE is in accordance with ISDN user part (ISUP). The signaling system used at the access is e.g. DSS1. For the signaling data transmitted end-to-end a virtual path exists between the two CCBS-ASEs, as shown by the dotted line in FIG. 1. It should be noted that the signaling connection control part (SCCPs) (see Table 1, pos. 23) in the transit exchanges TE do not effect the signaling data originating from the CCBS-ASEs.

Figure 1:
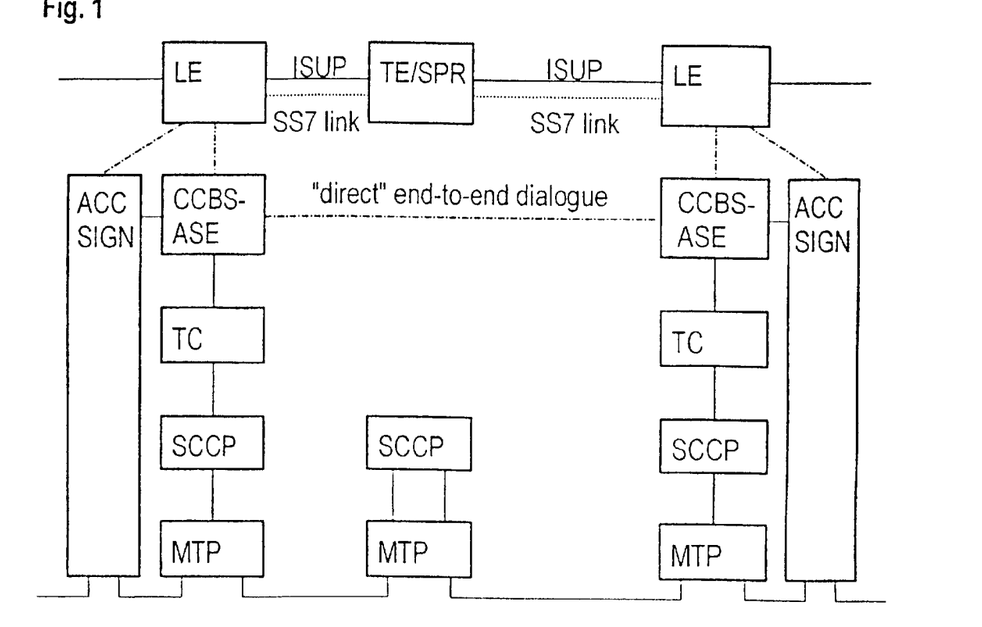
FIG. 1 is a block diagram of a network and protocol architecture for a CCBS.

The signaling for the CCBS service is "end-to-end" between the CCBS-ASE containing a CCBS register and the CCBS-ASE containing a CCBS queue. The "end-to-end" signaling is a user of transaction capability (TC) (Table 1, pos. 25), the messages are routed through the network via the SCCPs with normal public E.164 numbers, indicating a subscriber access at the local exchange LE. Interworking with Q.931 accesses, e.g. private branch exchange (PBX), are possible but, in this case, the "end-to-end" information flow will not use TCs all the way. This does not, however, effect the information flow itself, only the medium and coding of the information. CCBS-ASEs do not exist in intermediate exchanges. The CCBS call indicator and the CCBS possible indicator are transmitted via the ISUP.

CCBS request is a direct communication between a CCBS register in the originating CCBS-ASE, normally located in the calling subscriber local exchange LE and the CCBS queue in the destination CCBS-ASE, normally located in the called subscriber local exchange LE. The called party's E.164 number must not be manipulated when signaling data is transmitted between the two CCBS-ASEs, because the signaling is identified by the E.164 number and the CCBS register must know the called party number identifying the called party in the CCBS queue location.

It should be noted that the following CCBS functions, among others, are also handled by the "end-to-end" signaling established between the CCBS register in the calling party's CCBS-ASE and the CCBS queue in the called party's CCBS-ASE:

a) CCBS Cancel;

b) CCBS Suspend;

c) CCBS Resume; and d) Retain option

None of these functions are dependent on the signaling transparency between the two CCBS-ASEs.

Figure 2A:
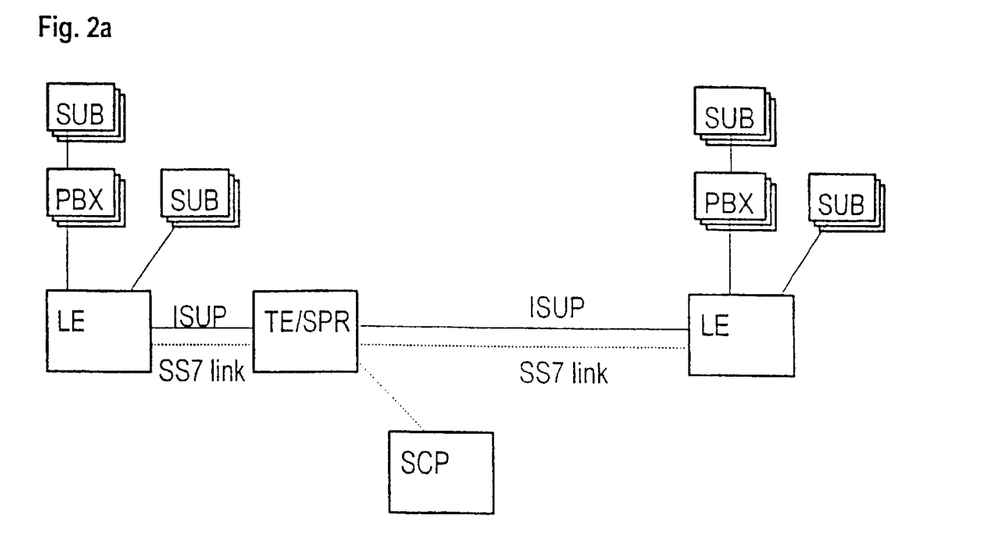
FIGS. 2a and 2b are block diagrams of a network architecture for GVNS, realized as an IN-service (FIG. 2a) and realized in a transit exchange supplemented by a GVNS-routing function (FIG. 2b)
Figure 2B:
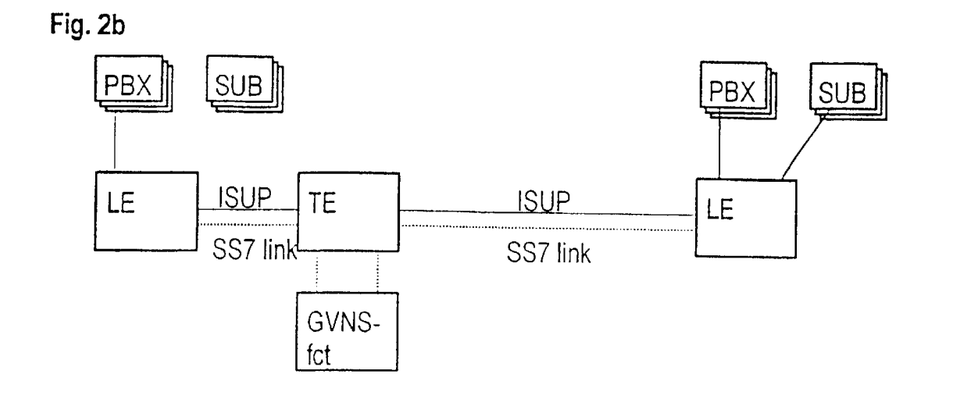

FIG. 2a shows the network architecture for GVNS. One, or more of the transit exchanges TE may include a GVNS routing function, FIG. 2b. The GVNS function may alternatively be provided in a service control point SCP, FIG. 2a. The GVNS routing function operates with database support and modifies the called subscriber routing code (dialed number) to make the call possible.

The CCBS service uses the called party's E.164 number. This number is used in the CCBS register for later CCBS call set-up, and in the CCBS queue for monitoring of the called subscriber and identification of the received CCBS call. If this were not done, the called subscriber in the original call, the CCBS request and the CCBS call cannot be tied to each other. Other signaling information used by the CCBS-ASE has no relevance to routing the CCBS messages through the network and is not affected by GVNS.

The GVNS routing function manipulates the called party number. The GVNS routing function creates, by use of data received from a data base, the terminating network routing number instead of the terminating participating service provider identification. For example, the originating local exchange LE and the destination local exchange LE are not aware of the same called party number.

The basic problem for CCBS is that, for a GVNS call, the functional entities, where the CCBS register and the CCBS queue are located, do not identify the called subscriber with the same E.164 called party number. They are not aware of the number used at the remote (local) location. Since the CCBS service is based on usage of the same number in the CCBS register and the CCBS queue, the service will not work over GVNS without additional procedures in either CCBS, GVNS, or both.

The called party number used at the destination is known only by the terminating local exchange LE and by the GVNS routing function. Since the terminating local exchange LE does not know that the call is a GVNS call, (and, therefore, that special procedures should be applied), the node with the GVNS routing function must send that number back to the originating local exchange LE, (or where appropriate the originating private branch exchange, PBX), when the called user is busy, (or where there is congestion at the interworking point with private networks). The only message sent in this call state is "REL" (Table 1, pos. 19: REL, Release message). A new parameter, or a backward GVNS parameter with the addition of terminating network routing number (TNRN), which amounts to a new parameter, has to be added to the release message REL to carry this number. If the connected number is used, the originating local exchange LE will not know that special CCBS procedures will apply. In any case the connected number is not included in the release message REL.

If the called party number used at the destination local exchange LE can be received by the originating local exchange LE, the number could be used in the CCBS request, instead of the stored called party number, (i.e. the dialed number or the subscriber routing code). The recall would work in these circumstances.

When a CCBS call is set up, the originating local exchange LE may use the stored called party number (i.e. the dialed number) and not the received number (i.e. the number used at the destination and in the CCBS request operation), since the number in the CCBS call set-up should be manipulated, in the same way as for the original call, in the GVNS routing function and the resulting called party number (i.e. subscriber routing code), received by the destination local exchange LE, will be the same as the number stored in the CCBS queue. If the converted number is used for the CCBS call from the originating local exchange LE, no request for number translation will be sent to the GVNS routing function, since the conversion in the GVNS routing function will not work, since it would be the wrong number used as input to the conversion.

The solution to this problem, proposed by the present invention, is illustrated in FIG. 3. A special trigger mechanism is provided in the call control function CCF of the access signaling protocol entity. This mechanism will then initiate a request for a number translation. This will be done using the existing interface to an intelligent network (IN), which can also be used, when the GVNS routing function or a service control function SCF is not provided in the service control point SCP but in a supplement to a transit exchange TE. For the communication between the local exchange LE and the GVNS routing function or the service control function SCF an intelligent network application part (INAP) protocol can therefore be used. Upon receiving the converted number from the GVNS routing function or the service control function SCF the access signaling protocol entity will then inform the CCBS-ASE. From hereon normal CCBS procedures apply. Since the converted number is now available in the CCBS-ASE of the local exchange LE a "direct" end-to-end dialog between the CCBS-ASEs involved can be established and maintained without modification of the ASEs. The use of the trigger mechanism solution results in that no additions need to be made in the signaling protocols for GVNS and CCBS. The CCBS supplementary service realized in the local exchange LE is not affected at all. Thus, the interworking problem can be resolved, in accordance with the present invention, entirely within the access signaling protocol entity, without affecting the existing CCBS implementations.

Until completion of a requested service (e.g. CCBS) the converted number will preferably be kept available by the call control function CCF. In case of a calling subscriber connected to the local exchange LE a further number translation during the CCBS call could be avoided: as soon as the called subscriber has terminated his call (and is therefore no longer busy) the calling procedure can be resumed (execution of the CCBS call: the local exchange LE of the calling subscriber processes the circuit related call) while using the converted number which has been kept available in a memory of the call control function CCF. In case of a calling subscriber connected to the private branch exchange PBX the CCBS call may enter the public switched telephone network (PSTN)/ISDN via a local exchange LE different from the one that was involved in the CCBS dialog: since the converted number is not available in the call control function CCF of the local exchange LE the normal procedure for circuit related call establishment applies.

Figure 4:
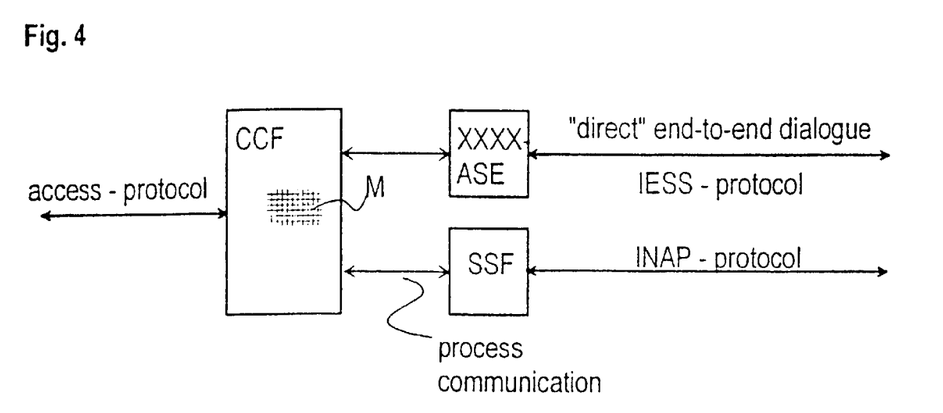
FIG. 4 is a block diagram illustrating the functional entities involved, for provision of CCBS over GVNS.

FIG. 4 illustrates the functional entities involved, for provision of CCBS over GVNS. Process communication is taking place between the call control function CCF and the service switching function SSF contained in the local exchange LE of the calling subscriber, acting temporary as a service switching point SSP on the one hand and between the call control function CCF and the application service element (e.g. for CCBS) on the other hand. The application service element for CCBS, is the service handler for CCBS which, among other things, creates the signaling contents of the dialogue between two CCBS-ASEs, one in the local exchange LE of the A-subscriber and one in the local exchange LE of the B-subscriber. The call control function CCF contains a memory M in which the translated number is stored for future use.

Figure 5:
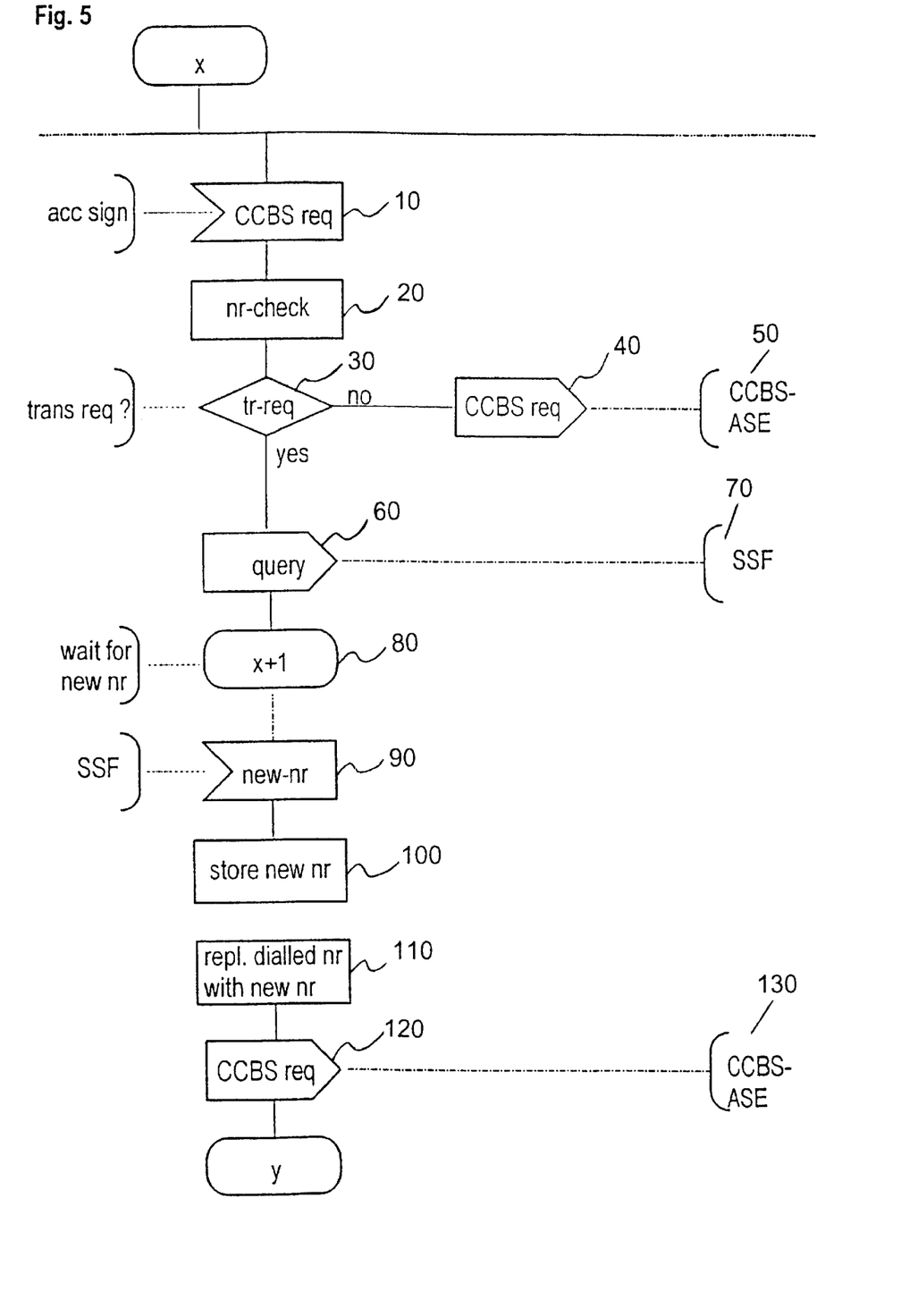
FIG. 5 is a flow chart illustrating the adaptation in the call control function part of the existing protocol machine for the access signaling.

FIG. 5 shows the changes in the protocol entity of the access signaling (described as a finite state machine).

Upon a CCBS request (CCBS req—step 10) from a subscriber, whose call reached a busy subscriber, the called number is analyzed in step 20 (nr-check).

In a next step 30 (tr-req) it is decided whether a number translation is required (e.g.: the called number is XX XX which must be converted to 031–322 XX XX).

In the case where the number translation is not required a CCBS-ASE is invoked, step 40, and the (called) number that is the actual number of the called subscriber, is forwarded to the CCBS-ASE, step 50.

In case where the number translation is required a query, step 60, is sent to the GVNS routing function, step 70.

After a waiting period, step 80, a new number is provided, step 90. Upon receipt of the new number it is stored in the memory M, step 100, the dialed number is replaced with the new number, step 110, and a CCBS-ASE is requested, step 120, and the converted number is forwarded to the CCBS-ASE, step 130.

The inventive concept resides in introducing a mechanism that allows the reuse of existing equipment to query a database and a memory location for the converted number. The invention has application in all connection set-ups in which the following service combinations exist:

a) completion of calls—GVNS;

b) completion of calls—virtual private network (VPN);

c) completion of calls—free number group;

d) completion of calls—personal number service; and e) completion of calls—intelligent network services having number recalculation in SCP The invention is not limited to completion of calls, but can be used for any ISDN end-to-end supplementary service using service logic distributed between two local exchanges LE, communicating with transaction capability based dialogs in those cases where the services interact with other services performing B-number recalculation (number translation).

I claim:

1. A method for operating a telecommunications system containing a plurality of local exchanges in which signaling and traffic data are routed via a network service having routing code recalculation, the method being adapted to provide an integrated services digital network (ISDN) end-to-end supplementary service involving an interaction between two subscribers each connected to a local exchange in which knowledge of a subscriber access code used in a called subscriber local exchange is required in a calling subscriber local exchange, the subscriber access code being generated by modification of a called subscriber routing code used by the calling subscriber local exchange, the modification occurs in one of a transit exchange and a service control point each having a translation device for converting the called subscriber routing code into the subscriber access code, each of the local exchanges connected to an application service element for providing the ISDN end-to-end supplementary service, the method which comprises the steps of:

providing the local exchanges supporting the ISDN end-to-end supplementary service with a trigger mechanism for triggering and forwarding a query to the translation device whenever the ISDN end-to-end supplementary service is requested and when the called subscriber routing code is detected; and forwarding the subscriber access code thus returned from the translation device to the application service element, which, based on a received subscriber access code, will establish one and only one end-to-end dialogue with an associated counterpart at the called subscriber local exchange and provide the ISDN end-to-end supplementary service.

2. The method according to claim 1, which comprises basing the translation device on a global virtual network service (GVNS) function located in one of a transit exchange and in a service control point and during the forwarding step the subscriber access code depending from the called subscriber routing code is taken from a database.

3. The method according to claim 1, which comprises:

locating the trigger mechanism in a call control function of the calling subscriber local exchange; and storing the called subscriber routing code in a memory location of the call control function assigned to the local exchange from which a call was originated is replaced by the subscriber access code and stored in the memory location.

4. The method according to claim 3, which comprises providing the translation device in the service control point and there is a service switching function contained in the local exchange and during the forwarding step the local exchange acts temporarily as the service switching point.

5. A method for operating a telecommunications system containing a plurality of local exchanges in which signaling and traffic data are routed via a network service having routing code recalculation, the method being adapted to provide an integrated services digital network (ISDN) end-to-end supplementary service involving an interaction between two subscribers each connected to a local exchange, which comprises the steps of:

generating a subscriber access code by modification of a called subscriber routing code used by a calling subscriber local exchange, knowledge of the subscriber access code used in a called subscriber local exchange is required in the calling subscriber local exchange;

performing the modification in one of a transit exchange and a service control point each having a translation device for converting the called subscriber routing code into the subscriber access code;

providing each of the local exchanges to be connected to an application service element for providing the ISDN end-to-end supplementary service, the local exchanges supporting the ISDN end-to-end supplementary service include a trigger mechanism for triggering and forwarding a query to the translation device whenever the ISDN end-to-end supplementary service is requested and when a called subscriber routing code is detected; and forwarding the subscriber access code thus returned from the translation device to the application service element, which, based on a received subscriber access code, will establish one and only one end-to-end dialogue with an associated counterpart at the called subscriber local exchange and provide the ISDN end-to-end supplementary service.

* * * * *